United States Patent [19]

Straub

[11] Patent Number: 4,629,217
[45] Date of Patent: Dec. 16, 1986

[54] PIPE COUPLING

[76] Inventor: Immanuel Straub, c/o Straub Federnfabrik, Straubstrasse, 7323 Wangs, Switzerland

[21] Appl. No.: 864,847

[22] Filed: May 20, 1986

[30] Foreign Application Priority Data

Jun. 17, 1985 [CH] Switzerland ................. 2556/85

[51] Int. Cl.⁴ ........................................ F16L 17/04
[52] U.S. Cl. ................................. 285/112; 285/373
[58] Field of Search .............. 285/112, 373, 382.7, 285/340, 259

[56] References Cited

U.S. PATENT DOCUMENTS

| | | | |
|---|---|---|---|
| 1,905,324 | 4/1933 | Waters | 285/373 X |
| 2,449,795 | 9/1948 | Stillwagon | 285/112 X |
| 2,451,354 | 10/1948 | Ohls | 285/112 X |
| 3,116,078 | 12/1963 | Scherer | 285/112 X |
| 3,223,439 | 12/1965 | Stevens | 285/373 |
| 3,420,554 | 1/1969 | Straub | 285/340 X |
| 4,108,479 | 8/1978 | Straub | 285/373 X |
| 4,119,333 | 10/1978 | Straub | 285/373 X |

*Primary Examiner*—Thomas F. Callaghan
*Attorney, Agent, or Firm*—Werner W. Kleeman

[57] ABSTRACT

A pipe coupling for coupling together pipe ends of pipes to be interconnected comprises a clampable housing approximately in the shape of a tightening clamp or collar for being clamped about the pipe ends such that tightening of the clampable housing causes the housing to contract or draw together around the pipes to be connected. The housing possesses annular or ring-shaped, inwardly flexed flanges at its end faces. A sealing gasket made from an elastic material such as synthetic rubber is enclosed in the housing and possesses a substantially C-shaped axial cross-sectional configuration. Clamping rings provided on the inner sides of the sealing gasket are capable of being reduced in diameter and supported in axial direction on the housing. These clamping rings are provided on their inner surfaces with claws or claw-like elements. To limit the penetration depth of these claws, especially in soft pipe material, the substantially cylindrical clamping rings are supported in the housing by their outer jacket surfaces on the inner edges of the housing flanges and by respective stop members as well as respective substantially conical spring rings. The claws of the clamping rings comprise teeth protruding inwardly from the inner jacket surfaces of the clamping rings towards the centers of the pipe ends. These teeth possess convex backs arched away from the center portion of the pipe coupling and substantially flat front surfaces which extend into clamping ring recesses located substantially directly before these front surfaces.

8 Claims, 8 Drawing Figures

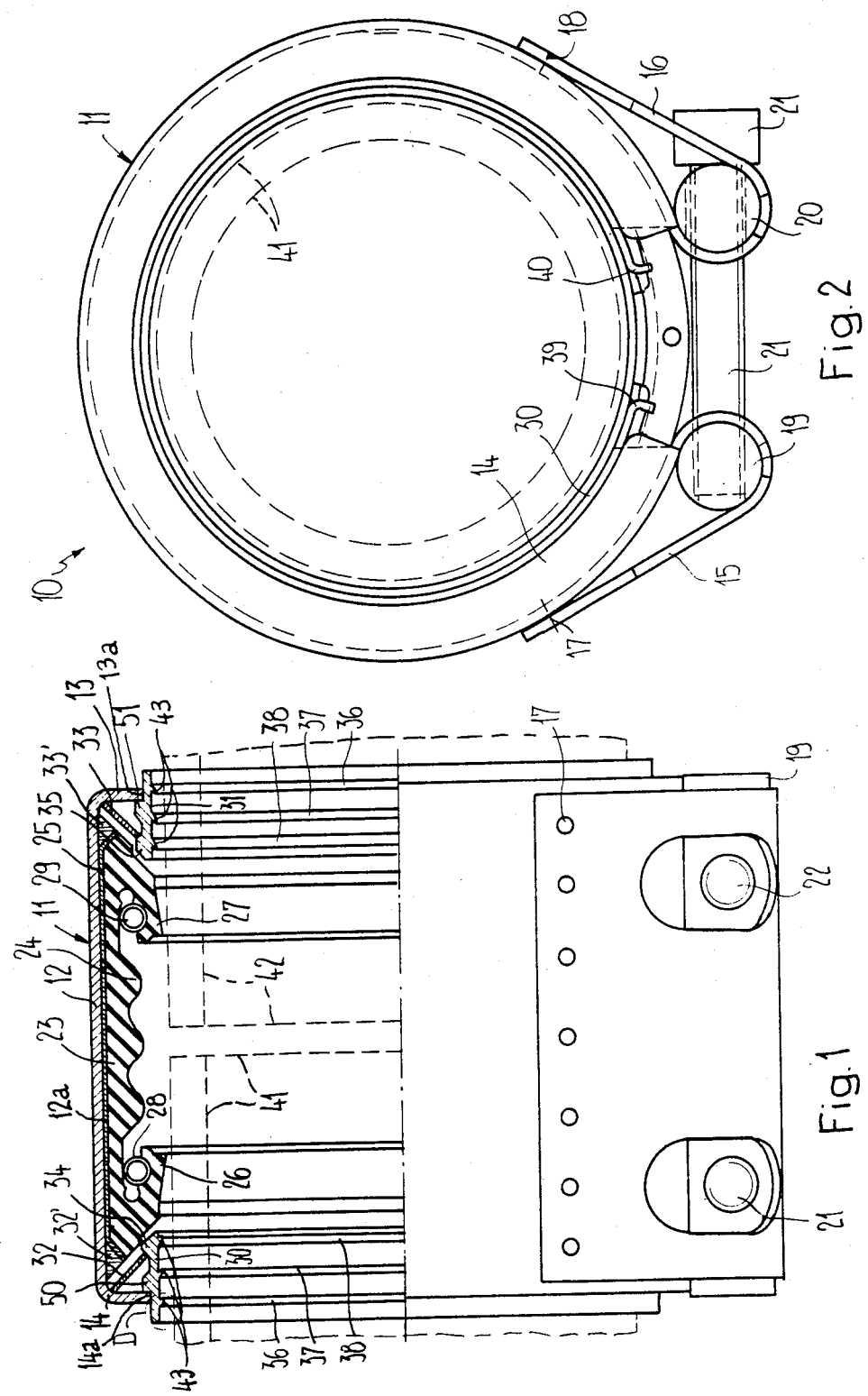

PIPE COUPLING

CROSS REFERENCE TO RELATED APPLICATION AND PATENT

The present application is related to my co-pending U.S. patent application Ser. No. 06/885,784, filed July 15, 1986, and entitled "Pipe Coupling", the disclosure of which is incorporated herein by reference. This application is also related to U.S. Pat. No. 4,108,479, granted Aug. 22, 1978, and entitled "Pipe Coupling".

BACKGROUND OF THE INVENTION

The present invention broadly relates to a new and improved construction of a pipe coupling for coupling together the pipe ends of pipes or conduits or the like which are to be interconnected.

Generally speaking, the present invention relates to a new and improved construction of a pipe coupling for coupling together the pipe ends of pipes or conduits or the like which are to be interconnected and possessing a clampable housing having approximately the shape of a tightening clamp or collar and capable of being clamped about the pipe ends. The housing is provided at its end faces with annular inwardly flexed or deformed flanges as well as a sealing gasket enclosed in the housing and which possesses a substantially C-shaped axial or longitudinal cross-sectional configuration. This sealing gasket is open towards the inside and possesses clamping rings structured as sealing lips and is supported in axial direction in the housing. These clamping rings are provided on their inner surfaces with radially distributed claws or claw-like elements which, by tightening the housing, are caused to dig into the outer jacket surfaces of the pipe ends which are to be interconnected.

An example of a prior art pipe coupling of this type is disclosed, for instance, in the Swiss Pat. No. 620,509, which is cognate to the German Patent Publication No. 2,731,465 and the U.S. Pat. No. 4,119,333, granted Aug. 10, 1978.

The abovementioned known pipe coupling possesses clamping rings having the form of substantially hollow truncated cones. These clamping rings rest in the axial direction with their outer diameter in the fillet or throat between the flanges of the end faces and the inner wall of the housing. The clamping rings of this known pipe coupling are laminated on their inner surfaces with radial incisions forming lamellae or tabs, wherein the lamellae overlap one another in an imbricated fashion. The free end edges of each of these lamellae thus form claws on the inner diameter of the clamping ring which are intended to dig or grip into the outer jacket or shell surface of the pipe ends to be interconnected during tensioning or clamping of the housing and to be fixedly anchored thereat.

The depth of penetration of these free end edges of the lamellae of the known pipe coupling is dependent, on the one hand, on the extent to which the housing is tightened and, on the other hand, is especially dependent on the material of the pipes.

It will be appreciated that with pipes made from soft, relatively easily plastically deformable materials, the clamping rings of the known pipe coupling leave marks on the outer surface of the pipes which are excessively deep and moreover leave even deeper marks or scoring with the passage of time. These marks weaken to a substantial degree the tensile strength of the pipes. This is especially true for non-reinforced pipes and for reinforced pipes made from a synthetic material or plastic and also for pipes made from certain lightweight metallic alloys.

It is further observed that the tensile strength of a pipe connection made with the abovementioned known pipe coupling is very limited with pipes made of such materials. Should such a connection or joint between pipes made from comparatively soft or pliable material be subjected to a high tensile stress, for example, because the lengths of the pipes have contracted as a result of cooling or as a result of internal compressive stresses, then the substantially soft pipe material cannot resist the penetration of the free end edges of the lamellae of the clamping rings. These lamellae of the clamping rings no longer then serve as clamping elements, but more like planing tools that cut or shave off the outer surfaces of the ends of the pipes which are pulled from the pipe coupling as a result of the tensile stresses acting on the pipe joint or connection. The clamping effect of the pipe coupling is then lost when the lengths of the pipes later expand and return to their original dimension.

There is a pragmatic rule which applies for synthetic or plastic pipes and which states that gripping or clamping elements or claws should penetrate to a maximum of approximately ten percent of the thickness into the outer surface of the pipe in order to not significantly weaken the tensile strength of the pipes. The depth of penetration of the free end edges of the lamellae of the previously mentioned known pipe coupling is, however, as already mentioned, not limited and therefore indeterminate.

SUMMARY OF THE INVENTION

Therefore with the foregoing in mind, it is a primary object of the present invention to provide a new and improved construction of a pipe coupling for coupling together the pipe ends of pipes which are to be interconneced which does not exhibit the aforementioned drawbacks and shortcomings of the prior art constructions.

Another and more specific object of the present invention aims at providing a new and improved construction of a pipe coupling of the previously mentioned type which not only provides a satisfactory sealing connection but which is also suitable for pipe couplings which are axially loaded, even for pipes made from soft or pliable material.

Yet a further significant object of the present invention aims at providing a new and improved construction of a pipe coupling of the character described which is relatively simple in construction and design, extremely economical to manufacture, highly reliable in operation, not readily subject to breakdown or malfunction and requires a minimum of maintenance and servicing.

Now in order to implement these and still further objects of the invention, which will become more readily apparent as the description proceeds, the pipe coupling of the present invention is manifested by the features that each clamping ring is substantially cylindrically shaped. The outer jacket surfaces of these clamping rings are braced or rest, on the one hand, on the inner edges of the flanges of each end face and, on the other hand, are supported or braced in the fillet or throat between the related flange and the inner wall of the housing by means of a stop formed at the corresponding clamping ring and by means of a truncated or frustro-conical cone-shaped spring ring. The claws or clawing or claw-like elements are in the form of inwardly directed teeth formed on the inner jacket surface of each clamping ring. These teeth or claws have backs which are convexly arched away from the center portion of the pipe coupling and also possess substantially flat front surfaces. Recesses of these clamping rings are located substantially directly before the flat front surfaces of these teeth, into which the flat front surfaces of the teeth protrude.

The cylindrical shape of each clamping ring allows the teeth of the inner jacket surface of the clamping rings which protrude inwardly to penetrate into the outer surfaces of the pipes only until the inner jacket surfaces of the clamping rings achieve a snug fitting on the outer surfaces of the pipes. The material of the pipe which is displaced by the teeth of the associated clamping ring is pushed or heaved-up into the recess located directly in front of the front surface of each respective tooth such that a respective profile is formed on the outer surface of each of the pipe ends which is substantially opposite or reversed, i.e. complementary, to the profile of the toothing or teeth on the inner jacket surfaces of the clamping rings. Even when a connection or joint between pipes which is formed by a pipe coupling according to the invention is subjected to a substantial tensile load, the teeth cannot cut or plane-off the surface of the pipes because the possibly cut or shaved-off pipe material cannot flow-off of or move away from the pipes due to the snugly fitting inner jacket surfaces of the clamping rings.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein:

FIG. 1 is a combined partial axial cross-section and partial side view of a preferred embodiment of a pipe coupling ready to be mounted upon the pipe ends which are to be interconnected;

FIG. 2 is an end view of the pipe coupling according to FIG. 1;

DETAILED DESCRIPTION OF THE PREFERRED EMBODIMENTS

Figure 3:
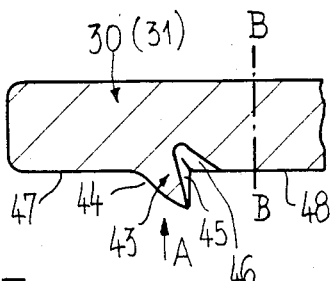
FIG. 3 shows on an enlarged scale, the portion enclosed by the detail circle D in FIG. 1 from which the axial profile of the teeth on the inner jacket surfaces of the clamping rings is visible, i.e. a section taken along the line III—III of FIGS. 4 and 5.

Describing now the drawings, it is to be understood that to simplify the showing thereof, only enough of the structure of the inventive pipe coupling has been illustrated therein as is needed to enable one skilled in the art to readily understand the underlying principles and concepts of the present invention. Turning now specifically to FIGS. 1 and 2 of the drawings, the apparatus illustrated therein by way of example and not limitation will be seen to comprise a pipe coupling 10 having a housing 11 approximately in the shape of a tightening clamp or collar. A housing body 12 of the housing 11 is essentially cylindrical and possesses at its ends inwardly directed flanges 13 and 14. Flaps or tabs 15 and 16 are formed integrally or in one-piece with the housing 11 and flexed or deformed outwardly and away from one another. The flaps or tabs 15 and 16 enclose respective, for instance cylindrical, clamping rods 19 and 20 or equivalent structure. These clamping rods 19 and 20 are interconnected with one another by means of a number of bolts or pins, here shown as two internal round bolts 21 and 22 with threading. The clamping rods 19 and 20 are provided with not particularly referenced transverse bores. The transverse bores of the clamping rod 19 are provided with internal threading. The end regions of the flaps 15 and 16 are advantageously welded or fused to the outer jacket or shell surface at locations 17 and 18 of the housing body 12.

In the exemplary embodiment under discussion, the heads of the bolts or pins 21 and 22 penetrate with play somewhat into the bent or flexed region of flap 16 through not particularly illustrated holes in the flap 16. These bolts 21 and 22 then successively pass with some play through transverse bores in the clamping rod 20 indicated by dashed lines at the bent or flexed region of the flap 16, then through not particularly illustrated openings at the bent or flexed region of the flaps 16 and 15, respectively, and finally penetrate into the transverse bores provided with internal threading and disposed at the clamping rod 19, which are illustrated with dashed lines. From what has been discussed hereinabove, it will be apparent that the housing 11 can be contracted or drawn together by tightening the bolts 21 and 22 in the manner of a tightening clamp or collar as is well known in this art.

As to the components which are present in the housing 11 between the flanges 13 and 14, attention is now particularly directed to the upper half of FIG. 1. The housing 11 encloses or surrounds a sealing gasket 23, preferably formed of a synthetic rubber or elastomeric material. This sealing gasket 23 is inwardly opened and possesses a substantially C-shaped configuration in its axial cross-section. The sealing gasket 23 has a web 24 whose inside surface comprises an undulated or corrugated profile in axial cross-section and whose outer surface, while interposing a steel band insert 25, tightly bears at the inner wall 12a of the housing body 12. The steel band insert 25, among other things, serves to bridge the gap present between the flexed or bent regions of the flaps 15 and 16. The web 24 has a corrugated or undulated profile in order to prevent the web 24 from raising or lifting away from the inside or inner wall 12a of the housing body 12 during alternating thermal loads or loading of the sealing gasket 23.

Merging with both ends of the web 24 of the sealing gasket 23 are the ends thereof, which are formed as sealing lips 26 and 27. These sealing lips 26 and 27 project inwardly and are, in turn, supported between their root and their own sealing edge by means of slightly twisted or helical spring rings 28 and 29 on the web 24.

Clamping rings 30 and 31 which are open and therefore capable of closing or reducing their diameters are provided adjacent to the front ends of the sealing gasket 23. These clamping rings 30 and 31 are supported with their outer jacket surfaces at the inner edges 14a and 13a of the flanges 14 and 13, respectively. Furthermore, each clamping ring 30 and 31 is supported by means of a respective bracing or supporting element, such as a substantially truncated cone-shaped or frustro-conical spring ring 32 and 33. Each of these respective truncated cone-shaped spring rings 32 and 33 rests with its inner periphery or surface on a respective shoulder 34 and 35 on the outer jacket surface of the clamping rings 30 and 31, respectively. The outer periphery or surface of each of these spring rings 32 and 33 grips or digs into the related throat or fillet between the housing body 12 and the flanges 14 or 13, respectively. A circlip or snap ring 32' and 33', each having a substantially triangular cross-section, is positioned between the respective spring rings 32 and 33 and the conical inwardly flexed or bent axial ends of the steel band insert 25.

Three crowns or rings 36, 37 and 38 are positioned in axial separation from one another from inwardly directed teeth on the inner jacket surface of each of the clamping rings 30 and 31. These crowns or rings 36, 37 and 38 contain teeth 43 illustrated in FIGS. 3 to 8. These crowns 36, 37 and 38 are, for the sake of simplicity, shown in the upper half of FIG. 1 only with solid lines extending downwardly, i.e. inwardly, from the inwardly projecting teeth 43. The shape or the profile of these teeth 43 is described hereinafter in relation to FIGS. 3 to 7. On both sides of each of the crowns 36, 37 and 38, the inner jacket surfaces of the clamping rings 30 and 31 are smooth and substantially cylindrical. The end portions of each clamping ring 30 and 31 are bent outwards at locations 39 and 40 as shown in FIG. 2 in order to maintain the rotational position or angular orientation of the clamping rings 30 and 31 in relation to the housing 11.

As mentioned earlier, the pipe coupling 10 is shown in FIGS. 1 and 2 before the threaded bolts 21 and 22 are tightened, i.e., ready to interconnect two pipe ends. In this condition the sealing edges of the sealing lips 26 and 27, as well as the clamping rings 30 and 31 including the inwardly projecting teeth 43, have an inner diameter which is greater than the outer diameter of the pipes to be interconnected. The outlines of the pipe ends to be interconnected are shown in FIG. 1 with dashed lines 41 and 42. The processes which occur during tightening of the threaded bolts 21 and 22 are hereinafter described in relation to FIG. 1, on the one hand, and in relation to FIG. 8, on the other hand. Before turning to these Figures, the inwardly projecting teeth 43 of the clamping rings 30 and 31 will be discussed hereinbelow.

In FIG. 3 there is shown—considerably enlarged and exaggerated—a section through a portion of the clamping ring 30 (detail circle D of FIG. 1) in order to describe the axial profile of the teeth 43 which are formed on the inner surfaces of the clamping rings 30 and 31. Each tooth 43 has the form of a substantially circular tooth such as the tooth of a rasp and is cut-out of or deformed from the inner jacket surface of the clamping ring 30 (the teeth 43 are formed in mirror symmetry at the opposite clamping ring 31). Each such tooth 43 possesses a convex back 44 arched away from the middle region of the pipe coupling 10, as well as a substantially flat front surface 45 facing the middle region of the pipe coupling 10. This front surface 45 extends as or simultaneously forms a respective wall of a recess 46 positioned directly in front of the front surface 45. Adjoining or next to the convex back 44 and the recess 46 are respective substantially smooth cylindrical sections 47 and 48 of the inner jacket surface of the clamping ring 30. Ideally, the volume of the recess 46 cut or deformed from the substantially cylindrical inner jacket surface corresponds approximately to the volume of the section of the tooth 43 protruding or projecting away from the substantially smooth cylindrical sections 47 and 48.

As is now to be shown, the teeth 43 penetrate, during tightening of the housing 11, into the outer surfaces of the pipe ends 41 and 42 to be interconnected. The pipe material displaced by the penetration of the teeth 43 into the outer surfaces of the pipe ends 41 and 42 moves or is displaced into the recess 46 so that a profile which is substantially opposite or reversed, i.e. complementary, to the profile shown in FIG. 3, but which has substantially the same volume, is impressed into the outer surface of the pipe ends 41 and 42.

Figure 4:
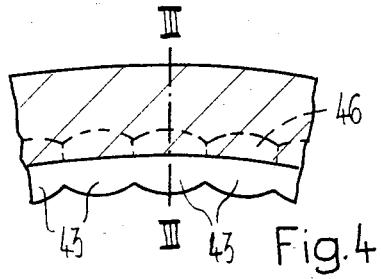
FIGS. 4 and 5 are sections taken along the line B—B of FIG. 3 and illustrating two different preferred embodiments.
Figure 5:
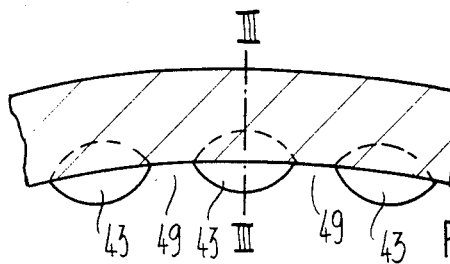
Figure 6:
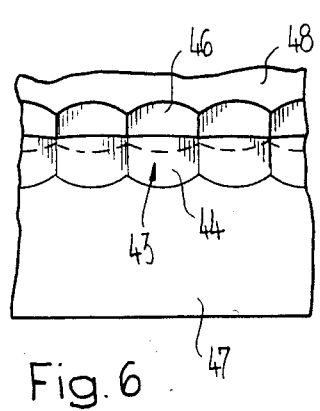
FIGS. 6 and 7 are views in the direction of the arrow A of FIG. 3 of the preferred embodiments of FIGS. 4 and 5, respectively.
Figure 7:
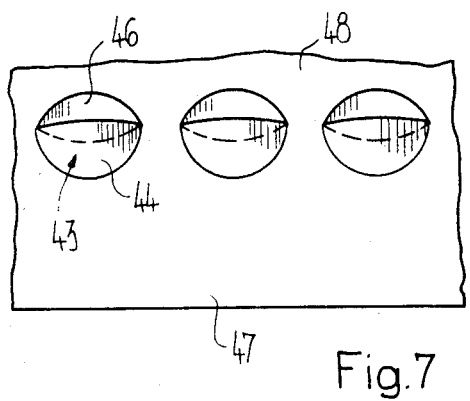
Figure 8:
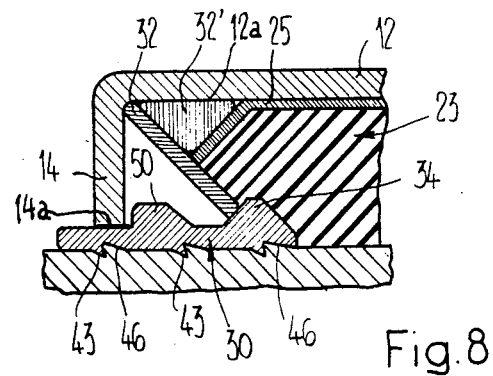
FIG. 8 is a detailed section on an enlarged scale of the pipe coupling in the region of the detail circle D of FIG. 1 of a tightened pipe coupling interconnecting pipes made from a synthetic material or plastic.

The so-called "tooth spacing" or pitch within each of the rings or crowns 36, 37 and 38 can also be selected to be lesser (cf. FIG. 4) or greater (cf. FIG. 5) as shown in FIGS. 4 and 5. This spacing between the crowns 36, 37 and 38 can be selected such that the row of teeth 43 is practically unbroken (cf. FIG. 4). If the spacing is selected greater than this, gaps 49 are formed between neighboring or adjacent teeth 43 which, to a certain degree, form a connection or communication between the smooth cylindrical sections 47 and 48. The pitch of the teeth 43 can be staggered or angularly displaced in circumferential direction from crown to crown of crowns 36, 37 and 28 by one half a pitch or tooth spacing or by some suitable fraction of a pitch spacing. The teeth 43 project inwardly several tenths of a millimeter from the cylindrical inner jacket surfaces of the clamping rings 30 and 31. These teeth 43 are drawn very exaggeratedly in FIGS. 3, 4 and 5.

The pipe coupling 10 can be placed over a pipe joint of pipe ends to be interconnected and the threaded bolts 21 and 22 can be tightened. The diameter of the housing 11 thereby decreases and the sealing gasket 23 is inwardly compressed until the sealing lips 26 and 27 sealingly come to bear upon the outer surfaces of the pipe ends 41 and 42. The sealing lips 26 and 27 are supported on the web 24 of the sealing gasket 23 by means of the spring rings 28 and 29. These sealing lips 26 and 27 are thus pressed onto the pipe ends 41 and 42, respectively, without undergoing any substantial expansion in the circumferential or tangential direction and without experiencing any wrinkling or creasing. The clamping rings 30 and 31 and the truncated conical spring rings 32 and 33 are also simultaneously squeezed together or compressed in diameter. The spring rings 32 and 33 somewhat reduce their aperture angle formed with the clamping rings 30 and 31. The clamping rings 30 and 31 are thereby displaced to a small degree in an axial direction in the housing 11, in addition to the reduction in diameter size, which promotes the penetration of the teeth 43 into the pipe material. As soon as the cylindrical sections 47 and 48 of the inner jacket surfaces of the clamping rings 30 and 31 sealingly come to bear upon the outer surfaces of the pipe ends 41 and 42 to be interconnected, the coupling or joining of the pipes is established. The end sides of the sealing gasket 23 bear snugly upon the backside of shoulder 34 and 35, respectively, on the inner region of the spring rings 32 and 33, and on the end region of the steel band insert 25. This condition is clearly illustrated in FIG. 8.

If the pipes so interconnected are now, for example, subjected to internal pressure, the pipe joint is put under tension. However, because the clamping rings 30 and 31 are firmly and substantially immovably anchored upon the outer surfaces of the pipes and, furthermore, since additionally cooperating elevated beads or stops 50 and 51, respectively, (cf. FIGS. 1 and 8) located on the outer jacket surfaces of the clamping rings 30 and 31, respectively, snugly come to bear upon the inner sides or walls of the flanges 14 and 13, respectively, the tension is satisfactorily absorbed by the housing 11. A very small axial displacement of the pipe ends 41 and 42 and thus also of the clamping rings 30 and 31 away from the middle region of the pipe coupling 10 is possible in the case that the recesses 46 are not completely filled with displaced pipe material. Such an axial displacement also results in the truncated conical spring rings 32 and 33 again somewhat enlarging their aperture angle or causing such spring rings 31 and 32 to become more erect, whereupon the clamping rings 30 and 31 are pressed even more tightly against the outside of the pipe ends 41 and 42, especially in the region of the ring or crown 38.

While there are shown and described present preferred embodiments of the invention, it is to be distinctly understood that the invention is not limited thereto, but may be otherwise variously embodied and practiced within the scope of the following claims.

Accordingly,

What I claim is:

1. A pipe coupling for coupling together pipe ends of pipes which are to be interconnected, comprising:
    a housing having end faces and an inner wall and defining an axial direction;
    means for clamping said housing about the pipe ends to be interconnected;
    said housing being provided at said end faces with inwardly directed annular flanges each having an inner surface;
    a sealing gasket enclosed in said housing and possessing a substantially C-shaped axial cross-sectional configuration;
    said sealing gasket opening inwardly and having end faces;
    respective substantially cylindrical clamping rings substantially enclosed within said housing and having an inner jacket surface defining an inner periphery and an outer jacket surface defining an outer periphery for supporting an associated one of said end faces of said sealing gasket;
    each of said respective substantially cylindrical clamping rings being retained at said outer periphery and in said axial direction within said housing and being provided at said inner periphery with claws engaging with the pipe ends when said housing is clamped;
    a respective substantially frustro-conical spring ring operatively associated with each said substantially cylindrical clamping ring;
    a respective stop formed on the outer jacket surface of each of said respective substantially cylindrical clamping rings;
    said outer jacket surfaces of said substantially cylindrical clamping rings being respectively braced on said inner surfaces of said annular flanges;
    each said substantially cylindrical clamping ring being supported in relation to a fillet located between an associated one of said annular flanges and said inner wall of said housing by means of said associated frustro-conical spring ring and said stop of the related substantially cylindrical clamping ring;
    said claws having substantially the shape of teeth formed on said inner jacket surfaces of said substantially cylindrical clamping rings and said teeth being inwardly directed;
    said teeth having backs convexly arched away from a center region of said pipe coupling and having substantially flat front surfaces; and
    said teeth having recesses located substantially directly before said substantially flat front surfaces into which extend said substantially flat front surfaces.

2. The pipe coupling as defined in claim 1, wherein:
    said teeth project outwardly from said inner jacket surfaces of said substantially cylindrical clamping rings.

3. The pipe coupling as defined in claim 1, wherein:
    said teeth and said therewith associated recesses being arranged in a plurality of crowns which are mutually axially spaced from one another; and
    both sides of each said crown being located adjacent to a respective substantially smooth section of said inner jacket surface of said respective substantially cylindrical clamping rings.

4. The pipe coupling as defined in claim 1, wherein:
    the volume of each of said recesses substantially corresponds to the volume of each therewith associated tooth.

5. The pipe coupling as defined in claim 1, wherein:
    said teeth are mutually spatially separated along the circumference of said respective substantially cylindrical clamping rings.

6. The pipe coupling as defined in claim 1, wherein:
    said teeth are spatially located in immediate mutual adjacency along the circumference of said respective substantially cylindrical clamping rings.

7. The pipe coupling as defined in claim 3, wherein:
    said teeth in each of said crowns are in spaced relationship and which tooth spacing is substantially the same around the circumference of each said crown.

8. The pipe coupling as defined in claim 7, wherein:
    each of said crowns is angularly displaced by one-half tooth spacing in a circumferential direction in relation to each neighboring crown of said plurality of mutually axially spaced crowns.

* * * * *